Oct. 29, 1935.  E. S. OSWOOD  2,019,317
LEVEL AND ANGLE INDICATOR
Filed June 6, 1932  2 Sheets-Sheet 1
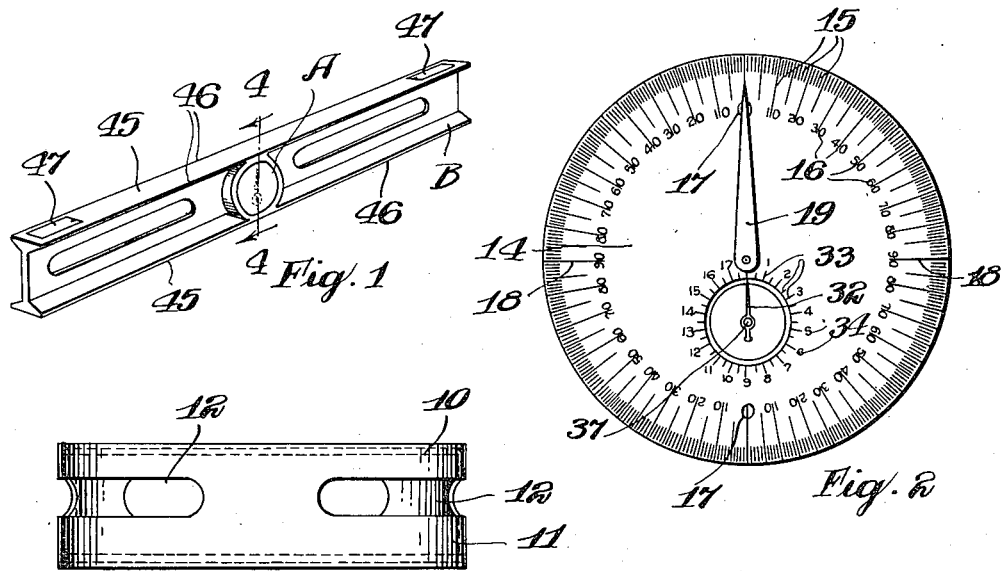
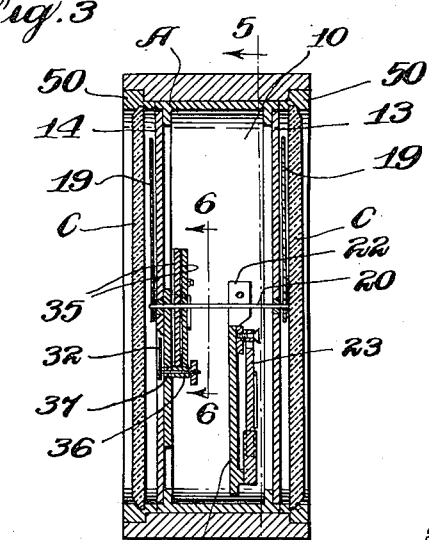
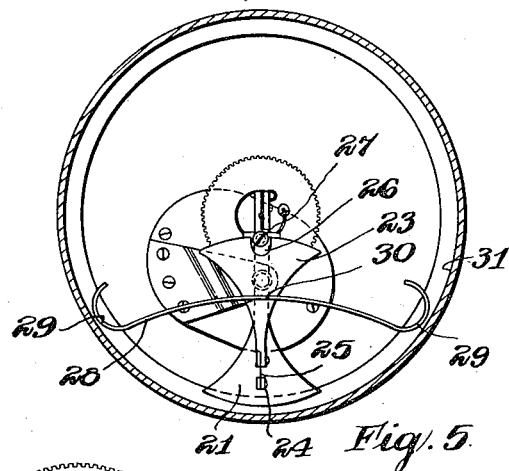
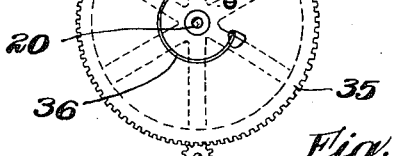
Inventor
Elmer S. Oswood
By Howard Riehe
Attorney

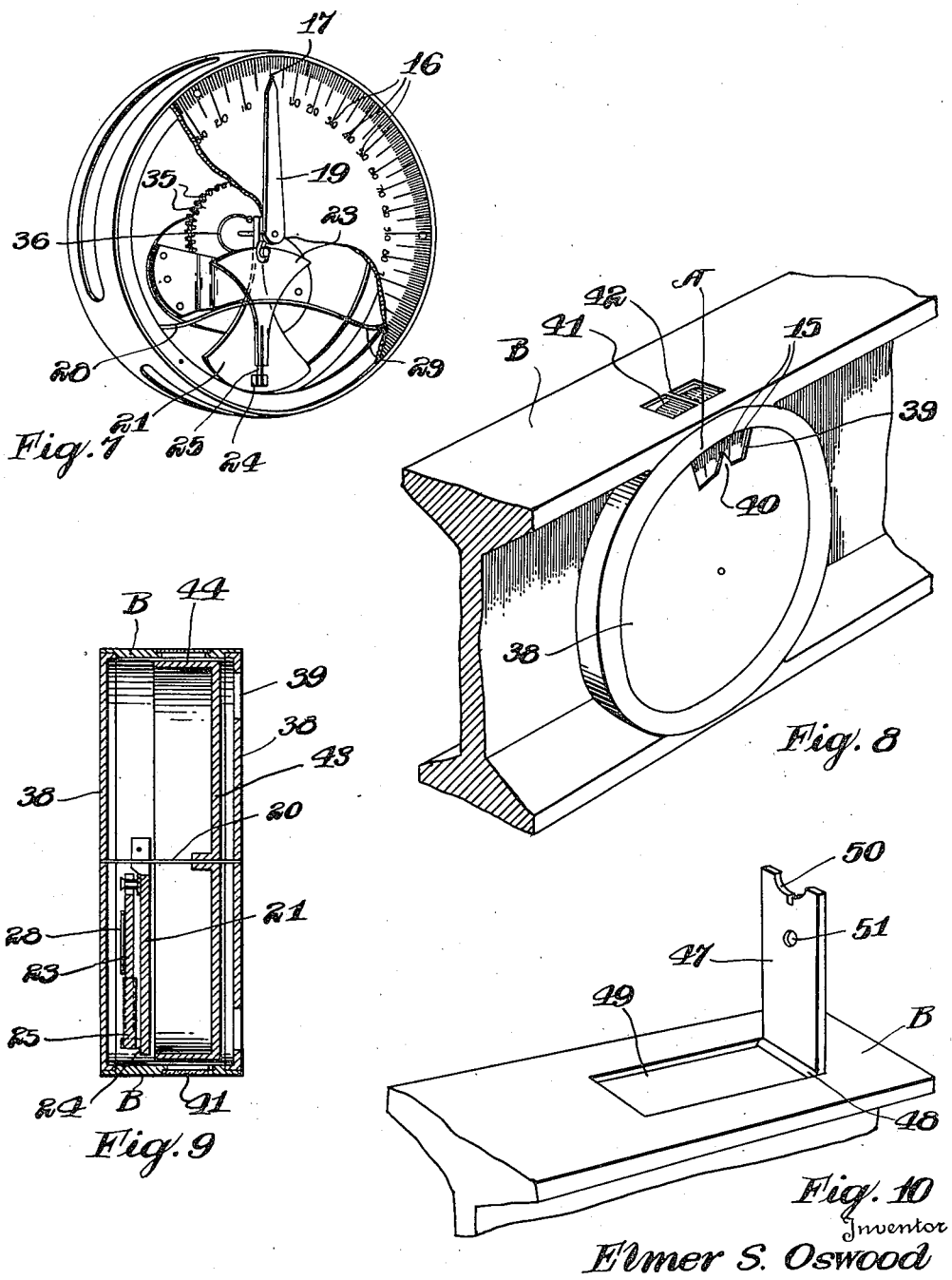

Patented Oct. 29, 1935

2,019,317

UNITED STATES PATENT OFFICE 2,019,317

LEVEL AND ANGLE INDICATOR

Elmer S. Oswood, Minneapolis, Minn., assignor of one-half to Arthur L. Hogenson, Minneapolis, Minn.

Application June 6, 1932, Serial No. 615,572

12 Claims. (Cl. 33—220)

My invention relates to a level and angle indicator which is adapted to be supported in a suitable manner and may be carried in a level bar of any desirable construction which protects the level and angle indicator and acts as a true bar for the support of the same.

A feature resides in a level and angle indicator having a means of indicating the level or the angle by a swinging or rotating pointer means which operates to indicate level or angle on the graduated dial. The indicator is provided with two indicating faces, one on either side, so that when the same is supported in the level bar, the indicator may be read from either side of the same.

A further and primary feature of my level and angle indicator resides in providing a secondary indicating hand or means which is adapted to indicate the degrees and fractions thereof on a larger scale than by the main indicating member, thereby permitting a more accurate reading to be observed at a glance by my level and angle indicator.

It is a feature to provide a level and angle indicator wherein the angle bar may be made of light weight metal which may be of aluminum alloy and particularly such form of light weight metal where the same is hard and not easily injured in use, and wherein the body of the same may be formed I-shape or channel shape, or of a shape to provide a strong firm body with flat parallel sides. This body of my level and angle indicator is preferably provided with disappearing sight plates which are recessed in the body of the level and angle indicator so that they may be moved out of operating position or readily moved into operating position to permit the level to be used as a sighting instrument when it is desired.

A further desirable feature of my indicator resides in an indicating means of a cylindrical or drum-like nature which rotates freely in relation to a fixed point to indicate from zero to the desired degree of the angle at which the level is positioned. When the cylindrical indicator is employed the degrees may be marked thereon on the outer cylindrical periphery and also on the face or sides thereof. When the level and indicator is constructed as just set forth, then it is preferable to provide the body with window opening means in the sides thereof with fixed indicators in the form of pointer means or hair line means which are adapted to co-operate with the window to indicate the degrees by the level. The window may be in the form of a slot or small opening so that only a small portion of the indicating cylinder or drum is illustrated therethrough.

My level and angle indicator is formed with an important structure wherein a brake is provided which causes the indicating means of the level to come quickly to rest after moving from one point to another. This permits the level and angle indicator to be used readily by workmen to indicate levels and degrees of angles quickly owing to the steadying nature of the braking means which controls and steadies the movement of the rotating parts of the level and angle indicator.

These features and other details and objects will be more clearly and fully defined.

In the drawings forming part of this specification:

Figure 1 is a perspective view of my level and angle indicator in its entirety.

Figure 2 is a face view of the level and angle indicator proper.

Figure 3 is a plan view of Figure 2.

Figure 4 is a central section on the line 4—4 of Figure 1.

Figure 5 is a section on the line 5—5 of Figure 4, in the direction of the arrows.

Figure 6 is an enlarged detail on the line 6—6 of Figure 4.

Figure 7 is a perspective of the level and angle indicator with a portion broken away.

Figure 8 is an enlarged perspective of another form of the level and angle indicator.

Figure 9 is a central section through the level and angle indicator proper of the construction illustrated in Figure 8.

Figure 10 is a perspective of a portion of the body of the level and angle indicator, showing a sight used with the instrument or level.

The level and angle indicator includes the instrument A and the body or level bar B in which the instrument A is adapted to be mounted. I have illustrated the instrument A in a disc-like form, having a casing 10 in which the parts of the instrument A are mounted.

The casing 10 is provided with a cylindrical portion 11 in which peripheral slots 12 may be formed to lighten the weight of the same and to give access to the instruments held between the side faces 13 and 14. Thus the cylindrical portion 11 and the side faces 13 and 14 form the casing 10 for supporting the members of the instrument A.

Each of the faces or dials 13 and 14 is formed with graduations 15. These graduations may be provided with indicia 16 to indicate the degree of angle off of the zero point 17 indicated on each of the dials 13 and 14. Each dial 13 and 14 is provided with two zero points oppositely disposed and with two ninety degree points such as 18, which are also oppositely disposed. A suitable indicator hand 19 for each dial 13 and 14 indicates the angular degrees or the point of level by the position of the hands 19 on the instrument A.

The hands 19 are mounted on a common shaft 20 which extends between the dials 13 and 14 and may be suitably mounted in jewel bearings or otherwise if it is desired, so that the movement of the shaft 20 is free to permit the hands 19 to indicate on the opposite sides of the instrument A in their movement in the use of the level and angle indicator. The movement of the hands 19 is controlled by the main balancing weight member 21 which is rigidly attached by the clamp 22 to the shaft 20. The hands 19 are keyed to the shaft 20. A secondary balancing weight 23 is mounted on the lug 24 projecting from and near the lower free end of the balancing weight 21 by the spring 25 with the weight end of the balancing member 23 projecting toward the mounting clamp 22 of the weight 21, and the slot 26 of the weight 23 fitting over the pin 27 which projects from adjacent the mounting 22 of the weighted member 21. This provides a balancing weight means through the members 21 and 23 which rotate the shaft 20 and in turn urge the ends 19 on the respective faces or dials to indicate the degree of angle of my level and angle indicator. With this balancing means the hands 19 would move quickly and readily to indicate the angle or level by my instrument A, however, the shaft 20 would be rotated to rock the hands 19 back and forth until the weight means 21 and 23 brought the hand to rest. Therefore, I provide a means of steadying the indicator hands 19 or instrument A in a manner to bring the same quickly to rest at the proper indicating position.

The counter-balancing weights 21 and 23 are adapted to be steadied by the brake member 28 which is a spring member and is formed with curved braking ends 29. The member 28 is secured between its ends to the balancing weight 23 at 30. The member 28 is of a fine or small spring wire-like nature and the braking ends 29 are spaced from the inner surface 31 of the casing of the instrument A. The member 28 is just long enough so that when the weight 23 tilts from one side to the other by the movement of the same permitted by the slot 26 in relation to the pin 27, one end 29 of the member 28 will engage the surface 31 lightly or just sufficient to steady and stop the movement of the hand 19 or the rotation of the shaft 20 after the level and angle indicator has been moved from one position to the other. Thus the mechanism of the instrument A may be moved to indicate any angle quickly owing to the fact that the hands 19 come quickly to rest at the angle to be indicated.

I provide a secondary indicating hand 32 which operates in conjunction with the gauge marks 33 on the dial 14 and which is for the purpose of indicating by the indicia 34 the degrees of movement of the main indicating hand 19. The secondary indicating hand 32 is like a minute hand and is caused to be moved by the pair of gears 35 which engage the pinion 36 which in turn rotates the shaft 37 which carries the indicating hand 32.

The pair of gears 35 are connected together by a spring member 36, one end of which is mounted on one gear, and the other on the other gear, while one of the gears 35 is freely mounted upon the shaft 20 and the other gear is keyed to the shaft 20. Thus by means of the spring 36 a tension is provided between the the gears 35 and their engagement with the pinion 36 so that the back lash is absorbed through the operation of the spring 36 and the hand 32 is caused to register accurately in relation to the gauge marks 33. The gauge marks 33 are spaced apart to indicate degrees and fractions thereof between the main gauge marks or longer gauge marks, so that the indicia 34 will indicate each degree which co-operates with the indicating hand 32. By this means a fraction of a degree may be more readily indicated by the secondary indicating hand 32, owing to the greater space between each degree and the gauge marks indicating the fractions between each degree, therefore the operator of the instrument A may see at a glance the degrees indicated by the secondary hand 32 and the fractions thereof. This permits a more accurate reading by my instrument A which is very desirable for an instrument of this character.

The instrument A may be in the form illustrated in Figures 8 and 9, where the instrument is mounted in the level bar B with the plates 38 positioned on either side of the same and adapted to support the operating shaft 20. In this form the plates 38 are formed with the window openings 39 to indicate the degrees or gauge marks 15 of the instrument A through the same. The window 39 may be formed to provide an indicating pointer 40 so as to facilitate the indication of the degrees indicated through the window 39 in my level and angle indicator.

The level bar B may also be formed with indicating window 41, having a hair indicating bar 42 or wire, extending through the window 41.

In this last construction of the instrument A the shaft 20 supports the indicating cylinder 43 which has formed on its peripheral flange 44 gauge marks complemental with the gauge marks 15 to indicate through the window 41 the degrees of the instrument A, while the window 39 indicates the degrees 15 which are formed on the face of the cylinder 43. In this construction I provide the same balancing weights 21 and 23 which operate as hereinbefore set forth for the instrument illustrated in Figures 2, 4 and 5.

When the cylinder 43 is used as illustrated in Figures 8 and 9, no indicating hand is required such as 19, but rather the pointer 40 and the wire hair marker 42 are adapted to be fixed in relation to the level bar B to indicate the degrees while the cylinder 43 rotates into position to show the angle at which the level is positioned. This provides a suitable means of indicating in a simple manner through the windows 39 and 41, the level or angular position of my instrument A.

The level bar B may be of I-shape cross section, as I have illustrated, or channel or any other desirable form, to form a bar with true sides 45 which extend parallel and true edges 46 which extend parallel so as to provide a true and accurate level bar B in which the instrument A is mounted. It is apparent that the instrument A will be mounted in this level bar with the zero points 17 positioned so that when the bar B is perfectly level the indicator 19 or the indicators 40 and 42 will indicate the zero reading on the dial of the instrument A, the cylinder 43 providing the dial with two faces to read from through the windows 39 and 41.

The instrument A illustrated in Figure 4 is mounted in the level bar B as illustrated, and a suitable heavy glass C is held by the mounting rings 50 to protect the dials 13 and 14 of the instrument A. In the instrument A of Figures 8 and 9 the plates 38 take the place of the glass C.

When the bar B is moved out of level position, the instrument A will indicate instantly the angle at which it is tilted. In this manner and by means of the secondary indicator 32 a very accurate reading of the angular position of the bar B is obtained and thereby I provide a very desirable level and angle indicator. The steadying of the indicating members of my instrument A permits the level and angle indicator to be used freely and without waiting for a considerable period before taking an accurate reading. This is an important feature of my invention.

Heretofore dial-like instruments or indicators have been provided for use with levels and the like, however, they have not been provided with a means of balancing the same in the manner in which I have set forth and owing to the free swinging of the indicating means, the rocking of the indicating hand is very undesirable. Such instruments cannot be quickly read, or it is necessary to wait for a long period before an accurate reading can be obtained. This I have overcome in my instrument and have provided means whereby the same may be read quickly after it is set in the desired position. Further, the secondary indicating means of my instrument permits a more accurate reading to be obtained and provides a much more accurate level than in the former spirit type of levels which have been commonly used heretofore. With my instrument A, even the fractions of degrees are easily observed. I also provide disappearing sights 47 which are hingedly secured at 48 to the level bar B. These sights may be positioned at either end of the bar B as indicated in Figure 1, and as indicated enlarged in Figure 10. The sights 47 can be turned down into the recess 49 out of operating position when not desired. Each sight 47 may be provided with a sighting notch 50 and a sighting opening 51 if it is desired. With these sights my level and angle indicator provides an instrument of a very desirable nature for various uses. The level and angle indicator is adapted to give a true reading of the position of the level bar B.

In accordance with the patent statutes I have illustrated and described the construction and features of my level and angle indicator and I desire to have the same applicable to uses other than those herein set forth and defined with such variations as will come within the scope of the following claims.

I claim:

1. A level and angle indicator including, a casing a dial and an indicating means mounted in and supported by said casing, one of which is rotatable, the other of which is stationary, a pendulum weight on said rotatable member, an auxiliary weight forming a part of said pendulum weight, a resilient means directly connecting said weights, and shoulder means on said auxiliary weight adapted to strike said pendulum weight.

2. A level and angle indicator including, a casing a dial and an indicating means secured to and supported by said casing, one of which is rotatably mounted and the other of which is stationary, a pendulum weight for rotating said rotatable member, an auxiliary weight forming a part of and adding to said pendulum weight, a spring mounting on said pendulum weight for said auxiliary weight, and means for limiting the relative movement of said rotatable member and auxiliary weight whereby slight movement of the auxiliary weight tends to cause the auxiliary weight to strike against said rotatable member to move the same.

3. A level and angle indicator including a graduated dial, an indicating means rotatable with respect to said dial, means pivotally mounting said indicating means, a weight means secured for rotation with said indicating means, an auxiliary weight, means secured for rotation with said indicating means for resiliently mounting said auxiliary weight, and brake means secured to said auxiliary weight for braking the movement of said indicating means.

4. An indicating instrument to show level and angular positions thereof including a casing, primary indicating means adapted to show the position of said indicator by degrees, secondary indicating means adapted to show the degrees of movement of the indicator and fractions thereof, means connecting said indicators to operate the same in unison, means for rotarily mounting said indicators to said casing, balancing weight means for said primary and secondary indicating means mounted for rotation with said indicators, and brake means mounted for rotation with said indicators and engageable with said casing for stopping rotation of said indicators in either direction when said indicator is moved from one position to another.

5. A level and angle indicating instrument including a casing dial and indicating means rotatable in relation to each other in said casing, one of said means being stationary with said casing, balance weight means on the rotatable means for causing said rotatable means to automatically move to indicate the angular position of said instrument, auxiliary weight means on said rotatable means, brake means on said rotatable means actuated by said auxiliary weight and engageable with said casing, and a secondary indicating means connected to said first indicating means adapted to indicate fractional movements of said first named indicating means operated by said rotatable means.

6. A level and angle indicator including a casing, means supported by said casing to automatically indicate the angular position of said level and angle indicator from a zero point by a rotary movement of a portion of said means, and brake means on said rotatable portion operable in either direction by rotation of said indicator at an acceleration of speed to engage said casing for causing the rotatable portions of said means to come to virtually instant rest after moving from one position to another.

7. A level and angle indicator including a dial, an indicating means, means for mounting one of the aforementioned elements rotatable with respect to the other member, a casing supporting said elements, a pendulum weight secured to said rotatable element, an auxiliary weight mounted upon said pendulum weight capable of moving into angularity with said pendulum weight, and brake arms on said auxiliary weight engageable with said casing operable to retard swift or sudden movement of said pendulum weight.

8. A level and angle indicator comprising, a level bar, a level and angle indicating instrument including a chamber in said level bar, a graduated means to indicate the degree of angle of the position of said level bar, rotatable indicating means mounted on said level bar for rotation in said chamber, means for weighting said indicating means, and brake means secured to and rotatable with said rotatable indicating means engageable with the stationary inner chamber wall for steadying said indicating means virtually instantly with the coming to rest of said level bar.

9. A level and angle indicator comprising, a casing, a gauged indicating dial secured to said casing, indicating means rotatably mounted in said casing, said indicating means mounted to rotate in relation to said casing to indicate the degree of angle of the position of said indicator, balancing weight means secured to and rotatable with the rotatable indicating means, and brake steadying means engageable with the casing for stopping rotation of said rotatable indicating means, said brake steadying means secured to and mounted for rotation with said rotatable indicating means.

10. A level and angle indicator including a casing, stationary and rotatable level and angle indicating means mounted in said casing, means for balancing said stationary and rotatable means in relation to each other to cause the same to move into indicating position in accordance with the movement of said level and angle indicator, brake means engageable with said stationary means, and mounted on said rotatable means, a secondary indicating means also controlled by said braking means having means for indicating degrees of angles and fractions thereof of the position of said indicating means, and means connecting said secondary indicating means to said first indicating means to operate both of said indicating means in unison.

11. A level and angle indicator including a casing, a dial and an indicating pointer in said casing and supported thereby, one of said last named elements being secured stationary with respect to said casing and the other of said elements being mounted for rotation with respect to said casing and stationary element, weight means secured to and rotatable with the said other element mounted for rotation, brake means secured to and rotatable with said other element mounted for rotation, said brake means being engageable with said casing for stopping relative rotation of said other element.

12. A level and angle indicator comprising a casing, a gauged indicating dial mounted for rotation in said casing, balancing weight means secured to and rotatable with the rotatable dial, and brake steadying means secured to and rotatable with said dial and engageable with said casing for stopping rotation of said dial.

ELMER S. OSWOOD.